United States Patent [19]

Muschiatti et al.

[11] Patent Number: 5,405,921
[45] Date of Patent: Apr. 11, 1995

[54] POLYESTER COMPOSITIONS HAVING IMPROVED OPTICAL PROPERTIES AND HEAT STABILITY

[75] Inventors: Lawrence C. Muschiatti, Wilmington, Del.; Linda R. Bateman, Breckenridge, Colo.; William L. Strum, Midlothian, Va.; Edward J. Deyrup, Northeast, Md.

[73] Assignee: E. I. Du Pont de Nemours and Company, Wilmington, Del.

[21] Appl. No.: 89,023

[22] Filed: Jul. 14, 1993

Related U.S. Application Data

[63] Continuation-in-part of Ser. No. 12,693, Feb. 3, 1993.

[51] Int. Cl.[6] ............................................. C08L 67/00
[52] U.S. Cl. ................................... 525/444; 524/400; 524/605
[58] Field of Search ................. 524/400, 605; 525/444

[56] References Cited

U.S. PATENT DOCUMENTS

| | | | |
|---|---|---|---|
| 3,435,093 | 3/1969 | Cope | 525/176 |
| 3,516,957 | 6/1970 | Gray et al. | 524/394 |
| 3,639,527 | 2/1972 | Brinkman et al. | 525/176 |
| 3,960,807 | 6/1976 | McTaggart | 264/40 R |
| 4,336,343 | 6/1982 | Aharoni | 524/292 |
| 4,351,757 | 9/1982 | Hoeschele | 524/292 |
| 4,365,036 | 12/1982 | Lee | 524/299 |
| 4,366,273 | 12/1982 | Aharoni | 524/292 |
| 4,380,621 | 4/1983 | Nield et al. | 528/287 |
| 4,448,913 | 5/1984 | Coleman et al. | 523/455 |
| 4,463,121 | 7/1984 | Gartland et al. | 524/291 |
| 4,801,640 | 1/1989 | Dallmann et al. | 524/394 |
| 5,102,943 | 4/1992 | Logullo | 524/487 |

FOREIGN PATENT DOCUMENTS

| | | |
|---|---|---|
| 55-154130 | 12/1980 | Japan . |
| 56-109245 | 8/1981 | Japan . |
| 57-025352 | 2/1982 | Japan . |
| 57-096039 | 6/1982 | Japan . |
| 59-109551 | 6/1984 | Japan . |
| 53-143651 | 7/1984 | Japan . |

*Primary Examiner*—Veronica P. Hoke

[57] ABSTRACT

The present invention relates generally to oriented, crystallized polyester compositions which can be thermoformed and heat set with sheet cycle times. More specifically, the compositions of the present invention comprise specialized alkali metal-containing nucleating agents which provide high crystallization rates.

3 Claims, No Drawings

POLYESTER COMPOSITIONS HAVING IMPROVED OPTICAL PROPERTIES AND HEAT STABILITY

This is a continuation-in-part of co-pending U.S. patent application Ser. No. 08/012,693, filed Feb. 3, 1993.

FIELD OF THE INVENTION

The present invention relates generally to polyester compositions which can be thermoformed and heat set with relatively short cycle times. More specifically, the most preferred compositions of the present invention consist essentially of:
1. polyester base resin,
2. crystallization nucleant, and
3. optionally other additives, whereby the crystallization nucleant and the other additives, if any, meet the following criteria:
1. the nucleating agent and other additives, if any, are miscible with the polyester base resin; or
2. the difference in refractive index of: i) the base polymer; and ii) the base polymer plus nucleating agent and other additives, if any, is about 0.01 or less.

BACKGROUND OF THE INVENTION

Thermoplastic polyester materials have many commercial applications and are commonly used in fabrics, films and containers. Polyesters are popular due to their strength, flexural characteristics, clarity, thermal stability and food contact characteristics.

The compositions of the present invention were developed specifically for thermoforming processes which produce oriented, crystallized, clear (and transparent) articles. In such processes, the polyester is heat processed into a sheet and thereafter oriented, formed and heat set. These processing steps can be accomplished using conventional (or non-conventional) methods.

When such thermoforming processes use conventional polyester materials, cycle times are generally very long, making the process quite expensive and economically impractical. The long cycle times can be attributed to the slow crystallization rates of most conventional polyester resins. Conventional crystallization promoters (nucleants) can be added, but are generally detrimental to the properties, particularly the optical properties, of the final material.

A long-felt need therefore exists in the art for a polyester material having a high rate of crystallization (short cycle times), particularly when used according to the above described thermoforming processes. More particularly, after such processing, a long-felt need further exists for a final product having excellent clarity, transparency, heat stability, tensile strength, flexibility and the like.

SUMMARY OF THE INVENTION

The present invention is directed to particular polyester compositions which can be processed, particularly by thermoforming, into polyester articles having advantageous optical properties, heat stability, tensile strength, flexibility and cycle times.

DETAILED DESCRIPTION OF THE PREFERRED EMBODIMENT

The Polyester Base Resin

The preferred polyesters useful in the present invention include: 1. poly(ethylene terepthalate) ("PET"); 2. PET modified by incorporating diacids other than terepthalic acid (such as isopthalic acid) or glycols other than ethylene glycol (such as cylohexane dimethanol ("CHDM")); 3. copolymers containing terepthalic acid, CHDM and other dibasic acids such as isopthalic acid; and 4. poly(ethylene napthalate) ("PEN") and derivatives thereof.

The polyesters used according to the present invention should be thermoplastic and crystallizable, having a glass transition temperature ("Tg") of at least 50° C., and a melting point of at least 150° C. The more preferred polyesters will have a melting point of at least 200° C. The most preferred polyester is PET and derivatives thereof.

The polyesters useful in accordance with the practice of the present invention are generally obtained by known polymerization techniques from aromatic dicarboxylic acids, preferably the lower alkyl esters thereof such as the dimethyl ester of terephthalic acid. The aromatic dicarboxylic acid or its ester or anhydride is esterified or trans-esterified and polycondensed with a saturated diol such as ethylene glycol. Typical saturated diols include saturated aliphatic, cyclo-aliphatic, or aromatic diols, preferably the lower alkane-diols such as ethylene glycol. Mixtures of aliphatic carboxylic acids and saturated diols may also be used, but the above described physical properties (i.e., melting point and glass transition temperature) must generally be satisfied.

The polyesters should also have an appropriate molecular weight to obtain desired flexural characteristics; in terms of its intrinsic viscosity (IV), the polyester should have an IV of at least about 0.5 as measured in a 1:1 by weight solution of methylene chloride and trifluoroacetic acid. Preferably, the minimum intrinsic viscosity will be above about 0.65, and the most preferred polyesters will have an intrinsic viscosity of at least about 0.85. The polyester base resin preferably is present in an amount of about 79–99 wt % based upon the total weight of the formulations used in the practice of this invention. A single polyester material need not be used, and copolyesters, blends, etc. may alternatively be used.

Nucleating Agent

The present invention is also directed to the use of a nucleating agent which is preferrably miscible with the PET base resin. "Miscibile" as used herein is intended to describe the final composition after it has been thermoformed and heat set, whereby the final composition has not phase-separated to form a heterogeneous mixture of base resin and nucleant, or in other words, the final (thermoformed, heat set) composition is a single-phase solid solution. However, amorphous and crystalline phases can coexist in the otherwise homogenous mixture. The existence of a single phase can be determined by measuring optical clarity—a single phase will not diffract incident light or otherwise cause the composition to be opaque.

A substantially non-miscible nucleating agent can be used, provided the phase-separated final material has an index of refraction which differs from the base polyester polymer by about 0.01 or less. "Refractive index" is the ratio of the velocities of light in a medium and in air under the same conditions. The refractive index is measured by the ratio of the sines of the angles of incidence and refraction and is determined by a conventional refractometer by conventional methods. Numerous references are available which provide the refractive index of various materials.

A rapid method of estimating the effectiveness of a nucleating agent is to mix approximately equal amounts of PET and the agent in a DSC (Differential Scanning Calorimeter) cup and determine the peak crystallization temperature of the mixture on cooling from the melt by DSC. A more precise method of determining effectiveness is to mix known quantities of PET and nucleating agent, blend the mixture by melt extrusion, and determine the peak crystallization temperature of the product by DSC.

The preferred crystallization nucleant is a polyester-based nucleant which is miscible with the PET base resin and comprises alkali metal salts of polyester polymers having a number average molecular weight of at least about 1,000. The most preferred polyester based nucleants are the sodium and potassium salts.

Preferably, the "metal salt" polyester nucleating agent is formed first and then contacted with the polyester to be nucleated. Formation of the nucleating agent outside the PET is most preferred, since it provides relatively stable PET molecular weights.

The weight percent of metal ion relative to the entire weight of nucleating agent is preferably about 0.09 to 33 percent, depending on: 1. the identity of the metal; and 2. the number of —COOM end groups versus —CH$_2$CH$_2$OH end groups, where M represents a metal ion. In practice, the alkali metal content can be varied, depending upon the degree to which the crystallization temperature is to be raised and the degree to which the molecular weight is to be maintained.

When the alkali metal is sodium, the polymeric nucleating agent should contain at least about 0.5% by weight of sodium. The minimum values for other alkali metals will be lower or higher, depending on their atomic weights. Because of the way the nucleating agents are made, their molecular weights and related properties, such as viscosity, will be determined largely by the alkali metal content and will vary inversely with it. The contemplated nucleating agents have inherent viscosities of at least about 0.1 and number-average molecular weights of at least about 1000. Generally speaking, potassium can often be substituted in place of sodium with equally advantageous results.

When making a polyester thermoforming composition, the number of gram atoms of active alkali metal in the final composition is important. If the number of gram atoms of alkali metal is too low, the composition will crystallize too slowly for practical and economic processing. If the number of effective gram atoms of alkali metal is too high, the polyester composition will crystallize too rapidly during the thermoforming (or other heat stretching) process, and the resulting article will not be clear and transparent.

Surprisingly however, very low alkali metal concentrations can be used in the above described thermoforming (or other heat stretching) process, while maintaining an acceptable crystallization rate. Also surprisingly, oftentimes extremely high alkali metal concentrations can be used without substantially diminishing optical properties.

For a given alkai metal, the alkali metal concentration (or weight percent of nucleant) will vary according to the processing parameters of any particular process. When sodium is used, the concentration of sodium in the compositions of the present invention will be at least 15 parts per million ("ppm") or about $6.5 \times (10)^7$ gram-atoms of active sodium per gram of polyester base resin, and the maximum concentration of sodium being about 340 ppm sodium or about $15 \times (10)^6$ gram atoms of active sodium per gram of polyester base resin.

The actual weight percent alkali metal containing nucleating agent in the compositions of the present invention will depend upon the alkali metal, the atomic number of the alkali metal and the level of active alkali metal in the nucleant.

Where the base polyester has an extremely low crystalization rate, such as with polyesters having high loadings of comonomers, the nucleating agent can be added to levels above 20% by weight, if necessary. Normally however, the nucleating agent is used to an upper limit of about 20% by weight, and it is generally preferred that no more than about 12% by weight of the total composition is nucleant, since the addition of nucleant above about 12 weight percent generally does not improve the properties of the article and to some degree adverse effects may be observed, such as product haze or the like. When the alkali metal is sodium and the active sodium is present in the nucleant at 1500 ppm, the nucleating agent may be added up to about 12% by weight of the total composition, although 2% to about 7.5% is the preferred range.

Other useful nucleating agents can include the sodium or potassium salts of hydrocarbon carboxylic acids containing between about 7 and 25 carbon atoms, preferably greater than 12 carbon atoms. Representative of these acids (which are fatty acids) are stearic, pelargonic, and behenic acid.

The low molecular weight of these fatty acid salt nucleants enables the incorporation of relatively high levels of sodium or potassium into the final composition using relatively low weight amounts of nucleating agent. Hence, although these fatty acid salts may not be completely miscible with the polyester base polymer and although they may exhibit a refractive index which is non-identical with the base polymer, these fatty acid salts can be acceptable, due to the low loadings necessary to achieve an acceptable crystallization rate.

Other useful nucleating agents include the sodium or potassium salts of carboxyl containing organic polymers, such as copolymers of olefins and acrylic or methacrylic acids, or copolymers of aromatic olefins and maleic anhydride. This class of nucleants includes the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above, the olefin or aromatic olefin moiety ordinarily comprises 50–98 percent by weight of the copolymer, and preferably 80–98 percent.

Process For Manufacturing Clear, Heat Stable, Polyester Articles

The process of the present invention is directed to the use of resin comprising the polyester and nucleating agent described above. In the present invention, waxes or similar type fillers added to the resin must be specifically chosen to retain clarity. It has been found that most additives are detrimental to the optical properties of the final molded product. Generally speaking, the additive should either be: 1. miscible with the PET base polymer; or 2. provide a final composition with an index of refraction which is within about 0.01 of the index of refraction of the base polyester.

To obtain a clear transparent product based upon crystallized polyester, the polymer must be oriented prior to the onset of crystallization. The orientation (of the polyester) results in the formation of elongated crystallites. Such elongated crystallites allow incident light to pass without substantial diffraction resulting in a clear, transparent, crystallized product.

It is theorized that when the polyester resin compositions of the present invention are sufficiently oriented prior to crystallization, the crystallites (which are formed during orientation and on subsequent, controlled heat set) are elongated rather than spherulitic. These polyester crystallites have been found to allow incident light to pass through without significant diffraction, thereby resulting in clear, transparent articles which are stable to temperatures approaching the melting point of the unoriented polyester.

The crystallization of unoriented polyesters, in the presence or absence of crystallization promoters, will yield a spherulitic crystalline morphology, i.e., spherulitic crystallites which diffract light, thereby causing the crystallized polyester to become opaque.

In the absence of a crystallization nucleant, polyesters crystallize too slowly for practical, economical processing. The present invention is directed to the innovative discovery that orientable polyester polymers nucleated with compatible (polyester-based and/or sodium or potassium salts of hydrocarbon acids) nucleants can be oriented and crystallized at economically practical rates, (thermoforming cycle times of from about 5 to 11 seconds are typical) to produce clear, transparent articles over a wide range of nucleant concentrations. Conventional additives, such as most waxes, inorganic particles, such as silicon oxides, titanium dioxide and the like, and incompatible organic materials generally cause unwanted light scattering which inhibits transparency and clarity and generally causes a final article to be cloudy or opaque. The resin compounds of the present invention are substantially devoid of such light-scattering components. Translucent colorants can be used and the clarity of the article retained. Additives which do scatter incident light when incorporated in the base resin can be used, but the product will be cloudy or opaque.

The polyester compositions of the present invention can be thermorformed or otherwise heat processed by conventional (or non-conventional) processes, provided the process includes an orientation step prior to a forming step. The oriented formed article can then be heat set by conventional or non-conventional methods. Such processing of the resins of the present invention encompasses practical and commercially useful cycle times and produces heat resistant, clear, transparent polyester article.

Articles can be manufactured using the resin compositions and orientation/heat set processes of the present invention. The particular articles of manufacture for the present invention include thin-walled thermoformed polyester articles.

After the forming process, the article is preferably annealed or heat-set under restraint. The annealing or heat-setting is the known technique of heating the article so as to develop the crystallinity and minimize amorphous orientation. This is performed while the article is restrained, preferably in the mold itself, so that its desired shape is maintained. This heat setting must be done at a temperature of at least 93° C. and preferably between 135° C.–190° C. The heat setting conditions should be selected on the basis of the appropriate degree of crystallinity and thermal stability desired.

We claim:

1. An oriented, crystallized polyester composition which has been oriented prior to the onset of crystallization, the improvement comprising:
   said composition consisting essentially of:
   a) about 79 to about 99 weight parts of said polyester having elongated crystallites and a glass transition temperature of at least about 50° C., and a melting point of at least about 150° C. and an intrinsic viscosity of at least about 0.50;
   b) a salt of the crystalizable orientable polyester base resin, said salt containing from about $6.5 \times 10^{-7}$ gram atoms to about $15 \times 10^{-6}$ gram atoms of active alkali metal per gram of polyester and having a number average molecular weight of at least about 1000;
   c) 0 to about 20 weight parts of an additive which is either miscible with the polyester or provides a substantially similar index of refraction to the final composition so that the final composition is substantially clear and transparent.

2. A composition according to claim 1 wherein the polyester comprises:
   a) a poly(ethylene terephthalate) resin;
   b) a copolymer derived from terephthalic acid and cyclohexane dimethanol; or
   c) a poly(ethylene naphthalate) resin.

3. A composition according to claim 2 wherein the peak crystallization temperature of the composition determined by melting the composition and thereafter cooling the composition to its peak crystallization temperature as determined by differential scanning calorimetry is greater than about 150° C.

* * * * *